United States Patent
Lee et al.

(10) Patent No.: US 10,992,520 B2
(45) Date of Patent: Apr. 27, 2021

(54) NETWORK POLICY GRAPHS

(71) Applicant: Hewlett Packard Enterprise Development LP, Houston, TX (US)

(72) Inventors: Junggun Lee, Mountain View, CA (US); Chaithan M. Prakash, Madison, WI (US); Charles F. Clark, Roseville, CA (US); Dave Lenrow, Littleton, MA (US); Yoshio Turner, San Francisco, CA (US); Sujata Banerjee, Palo Alto, CA (US); Yadi Ma, Palo Alto, CA (US); Joon-Myung Kang, Palo Alto, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 117 days.

(21) Appl. No.: 15/500,628

(22) PCT Filed: Nov. 6, 2014

(86) PCT No.: PCT/US2014/064394
§ 371 (c)(1),
(2) Date: Jan. 31, 2017

(87) PCT Pub. No.: WO2016/072996
PCT Pub. Date: May 12, 2016

(65) Prior Publication Data
US 2017/0222873 A1 Aug. 3, 2017

(51) Int. Cl.
*G06F 15/177* (2006.01)
*H04L 12/24* (2006.01)
*H04L 12/64* (2006.01)

(52) U.S. Cl.
CPC ...... *H04L 41/0803* (2013.01); *H04L 12/6418* (2013.01); *H04L 41/085* (2013.01); *H04L 41/0893* (2013.01); *H04L 41/12* (2013.01)

(58) Field of Classification Search
CPC ............ H04L 41/0803; H04L 12/6418; H04L 41/085; H04L 41/0893; H04L 41/12
See application file for complete search history.

(56) References Cited

U.S. PATENT DOCUMENTS

| | | | |
|---|---|---|---|
| 6,393,473 B1 | 5/2002 | Chu | |
| 6,463,470 B1 | 10/2002 | Mohaban et al. | |

(Continued)

FOREIGN PATENT DOCUMENTS

| | | |
|---|---|---|
| CN | 101833497 A | 9/2010 |
| WO | 2012/092225 A1 | 7/2012 |

(Continued)

OTHER PUBLICATIONS

Turner, Y., et al., "International Appl. No. PCT/US2015/041547 entitled Adding Metadata Associated With a Composite Network Policy" filed Jul. 22, 2015 (35 pages).

(Continued)

*Primary Examiner* — Suraj M Joshi
*Assistant Examiner* — Ayele F Woldemariam
(74) *Attorney, Agent, or Firm* — Hewlett Packard Enterprise Patent Department

(57) ABSTRACT

Example implementations disclosed herein can be used to generate composite network policy graphs based on multiple network policy graphs input by network users that may have different goals for the network. The resulting composite network policy graph can be used to program a network so that it meets the requirements necessary to achieve the goals of at least some of the network users. In one example implementation, a method can include receiving multiple (Continued)

network policy graphs, generating composite endpoint groups based on relationships between endpoint groups and policy graph sources, generating composite paths based on the relationships between the endpoints and the network policy graphs, generating a composite network policy graph based on the composite endpoint groups and the composite paths, and analyzing the composite network policy graph to determine conflicts or errors.

16 Claims, 8 Drawing Sheets

(56) References Cited

U.S. PATENT DOCUMENTS

| | | | |
|---|---|---|---|
| 6,675,353 B1 | 1/2004 | Friedman | |
| 6,880,005 B1 | 4/2005 | Bell et al. | |
| 7,028,057 B1 | 4/2006 | Vasudevan et al. | |
| 7,096,216 B2 | 8/2006 | Anonsen | |
| 7,707,619 B2 | 4/2010 | Shelest et al. | |
| 7,761,708 B2 | 7/2010 | Swander et al. | |
| 7,941,309 B2 | 5/2011 | Dublish et al. | |
| 8,141,125 B2 | 3/2012 | Maes | |
| 8,316,051 B1 | 11/2012 | Burns et al. | |
| 8,443,433 B2 | 5/2013 | Abzarian et al. | |
| 8,479,257 B1 | 7/2013 | Lloyd et al. | |
| 8,499,331 B1 | 7/2013 | Yehuda et al. | |
| 8,560,646 B1 | 10/2013 | Sivasubramanian et al. | |
| 8,830,823 B2 | 9/2014 | Koponen et al. | |
| 8,868,506 B1 | 10/2014 | Bhargava et al. | |
| 8,938,783 B2 | 1/2015 | Becker et al. | |
| 8,984,586 B2 | 3/2015 | Bezilla et al. | |
| 9,141,683 B1 | 9/2015 | Nagargadde et al. | |
| 9,270,704 B2 | 2/2016 | Clark et al. | |
| 9,680,872 B1 | 6/2017 | Roth | |
| 2003/0167277 A1 | 9/2003 | Hejlsberg et al. | |
| 2004/0015496 A1 | 1/2004 | Anonsen | |
| 2006/0020586 A1 | 1/2006 | Prompt et al. | |
| 2006/0025985 A1 | 2/2006 | Vinberg et al. | |
| 2007/0156736 A1 | 7/2007 | Bestgen et al. | |
| 2007/0255769 A1 | 11/2007 | Agrawal et al. | |
| 2007/0261048 A1 | 11/2007 | Bernabeu-Auban et al. | |
| 2008/0034310 A1 | 2/2008 | Kodosky et al. | |
| 2008/0065466 A1 | 3/2008 | Liu et al. | |
| 2008/0133978 A1 | 6/2008 | Angamuthu et al. | |
| 2008/0161941 A1 | 7/2008 | Strassner et al. | |
| 2008/0162109 A1* | 7/2008 | Strassner | G06F 40/14 704/1 |
| 2008/0205377 A1 | 8/2008 | Chao et al. | |
| 2008/0271111 A1 | 10/2008 | Cox et al. | |
| 2008/0320550 A1 | 12/2008 | Strassner et al. | |
| 2009/0059814 A1* | 3/2009 | Nixon | H04L 41/12 370/254 |
| 2009/0113420 A1 | 4/2009 | Pawlowski | |
| 2009/0228953 A1 | 9/2009 | Hu et al. | |
| 2009/0249431 A1 | 10/2009 | Mccollum et al. | |
| 2009/0271412 A1 | 10/2009 | Lacapra et al. | |
| 2009/0300069 A1 | 12/2009 | O'Sullivan | |
| 2011/0022681 A1 | 1/2011 | Simeonov | |
| 2011/0125804 A1 | 5/2011 | Aegerter | |
| 2012/0023546 A1* | 1/2012 | Kartha | H04L 63/104 726/1 |
| 2012/0110055 A1 | 5/2012 | Van Biljon et al. | |
| 2012/0143876 A1 | 6/2012 | Srinivasan et al. | |
| 2012/0166604 A1* | 6/2012 | Fortier | H04L 41/0893 709/223 |
| 2013/0064255 A1 | 3/2013 | Saavedra | |
| 2013/0124567 A1 | 5/2013 | Balinsky et al. | |
| 2014/0025877 A1 | 1/2014 | Talagala et al. | |
| 2014/0033268 A1 | 1/2014 | Julisch et al. | |
| 2014/0096188 A1* | 4/2014 | Mont | G06F 21/604 726/1 |
| 2014/0122670 A1 | 5/2014 | Levy et al. | |
| 2014/0136676 A1 | 5/2014 | Chow et al. | |
| 2014/0150053 A1 | 5/2014 | Chickering et al. | |
| 2014/0189270 A1 | 7/2014 | Iwanicki et al. | |
| 2014/0204948 A1 | 7/2014 | Beliveau et al. | |
| 2014/0230006 A1 | 8/2014 | Burke et al. | |
| 2014/0245423 A1 | 8/2014 | Lee | |
| 2014/0280900 A1* | 9/2014 | Mcdowall | H04L 41/12 709/224 |
| 2014/0282628 A1 | 9/2014 | Pruss et al. | |
| 2014/0282854 A1 | 9/2014 | Clark et al. | |
| 2014/0337285 A1 | 11/2014 | Gokhale et al. | |
| 2014/0372461 A1 | 12/2014 | David et al. | |
| 2015/0063102 A1 | 3/2015 | Mestery et al. | |
| 2015/0095895 A1 | 4/2015 | Taneja et al. | |
| 2015/0135265 A1 | 5/2015 | Bagrin | |
| 2015/0358209 A1* | 12/2015 | Zhang | H04L 41/0893 709/221 |
| 2016/0094647 A1 | 3/2016 | Mordani et al. | |
| 2016/0173371 A1 | 6/2016 | Bays | |
| 2016/0180096 A1 | 6/2016 | Sharma et al. | |
| 2016/0224604 A1 | 8/2016 | Petculescu et al. | |
| 2016/0323377 A1 | 11/2016 | Einkauf et al. | |
| 2016/0344834 A1 | 11/2016 | Das | |
| 2018/0089312 A1 | 3/2018 | Pal et al. | |
| 2019/0171670 A1 | 6/2019 | Zhuang et al. | |

FOREIGN PATENT DOCUMENTS

| | | |
|---|---|---|
| WO | WO-2012/092225 | 7/2012 |
| WO | WO-2014147197 | 9/2014 |
| WO | 2016/072996 A1 | 5/2016 |
| WO | 2016/186605 A1 | 11/2016 |
| WO | 2017/014769 A1 | 1/2017 |
| WO | 2017/095391 A1 | 6/2017 |

OTHER PUBLICATIONS

Sun et al., "A Network-State Management Service", SIGCOMM '14 Proceedings of the 2014 ACM conference on SIGCOMM, Aug. 2014, pp. 563-574.

Sravanthi et al, "Applications of Graph Labeling in Major Areas of Computer Science", International Journal of Research in Computer and Communication Technology, vol. 3, Issue 8, Aug. 2014, pp. 819-823.

Shanbhag, S. et al, "Automated Composition of Data-path Functionality in the Future Internet", IEEE Network, Nov./Dec. 2011, pp. 8-14.

Project Proposals, "Project Proposals:Group Based Policy Plugin", Available at <https://wiki.opendaylight.org/view/Project_Proposals:Group_Based_Policy_Plugin>, 9 pages.

Prakash et al., "PGA: Using Graphs to Express and Automatically Reconcile Network Policies," SIGCOMM '15 Proceedings of the 2015 ACM Conference on Special Interest Group on Data Communication, 2015, pp. 29-42.

Open Daylight, "OpenDaylight Group Policy," Available at <https://wiki.opendaylight.org/view/Group_Policy:Main>, 2 pages.

Open Networking Foundation, "Intent NBI—Definition and Principles", ONF TR-523, 2016, 20 pages.

Novarese, P.; Docker Success Center: 4 pages; printed on Apr. 26, 2017; from: https://success.docker.com/KBase/Introduction_to_User_Namespaces_in_Docker Engine.

Monsanto et al., "Composing Software-Defined Networks", 10th USENIX Symposium on Networked Systems Design and Implementation, Apr. 2013, pp. 1-13.

Mogul et al., "Corybantic: Towards the Modular Composition of SDN Control Programs", HotNets-XII Proceedings of the Twelfth ACM Workshop on Hot Topics in Networks Article No. 1, 2013, pp. 1-7.

Mestery, et al.; "Group-based Policy Abstractions for Neutron," Jul. 2, 2014, pp. 1-13, GitHub, Inc.

Mercian, A., et al; "Network Intent Composition: Main OpenDaylight Project"; Jan. 22, 2015; 7 pages.

Mentze, D., et al, ; "Project Proposals:Network intent Composition"; 5 pages; printed on Apr. 26, 2017 from: https://wiki.opendaylight.org/view/Project_Proposals:Network_Intent_Composition.

(56) References Cited

OTHER PUBLICATIONS

McKeown et al., "OpenFlow: Enabling Innovation in Campus Networks", ACM SIGCOMM Computer Communication Review, vol. 38, Issue 2, Apr. 2008, pp. 69-74.

Kubernetes, "Labels and Selectors", Available at <https://kubernetes.io/docs/concepts/overview/working-with-objects/labels/>, 8 pages.

Kim, H. et al.; "Kinetic: Verifiable Dynamic Network Control";Proceedings of the 12th USENIX Symposium on Networked Systems Design and Implementation, 2015, 15 pages.

Kim, H et al, "Simpler Network Configuration with State-based Network Policies", Oct. 1, 2013; 13 pages.

International Search Report and Written Opinion received for PCT Patent Application No. PCT/US2015/063123, dated Aug. 8, 2016, 9 pages.

International Search Report and Written Opinion received for PCT Patent Application No. PCT/US2015/041546, dated Sep. 8, 2016, 10 pages.

International Search Report and Written Opinion received for PCT Patent Application No. PCT/US2014/064394, dated Aug. 5, 2015, 10 pages.

International Preliminary Report on Patentability received for PCT Patent Application No. PCT/US2015/063123, dated Jun. 14, 2018, 8 pages.

International Preliminary Report on Patentability received for PCT Patent Application No. PCT/US2015/041546, dated Feb. 1, 2018, 9 pages.

International Preliminary Report on Patentability received for PCT Patent Application No. PCT/US2014/064394, dated May 18, 2017, 9 pages.

Gember-Jacobson et al., "Fast Control Plane Analysis Using an Abstract Representation," SIGCOMM, Aug. 22-26, 2016.

Fayaz et al., "Efficient Network Reachability Analysis Using a Succinct Control Plane Representation," Proceedings of the 12th USENIX Symposium on Operating Systems Design and Implementation, Nov. 2-4, 2016, 17 pages.

European Search Report and Search Opinion Received for EP Application No. 14905469.4, dated Oct. 19, 2017, 11 pages.

Docker Docs, "Docker object labels", Available at <https://docs.docker.com/config/labels-custom-metadata/>, 3 pages.

Cisco Systems Inc., "Cisco Application Centric Infrastructure Fundamentals", Aug. 1, 2014, 16 pages.

Canini et al, "Software Transactional Networking: Concurrent and Consistent Policy Composition", HotSDN '13 Proceedings of the second ACM SIGCOMM workshop on Hot topics in software defined networking, Aug. 16, 2013, 6 pages.

Berde, P et al, "ONOS: Towards an Open, Distributed SDN OS", Aug. 22, 2014.

S.K. Fayazbakhsh et al., "Enforcing network-wide policies in the presence of dynamic middlebox actions using flowtags," Apr. 2014, pp. 533-546.

Banikazemi et al. "Meridian: an SDN platform for cloud network services", IEEE Communications Magazine, vol. 51, No. 2, Feb. 2013, pp. 120-127.

\* cited by examiner

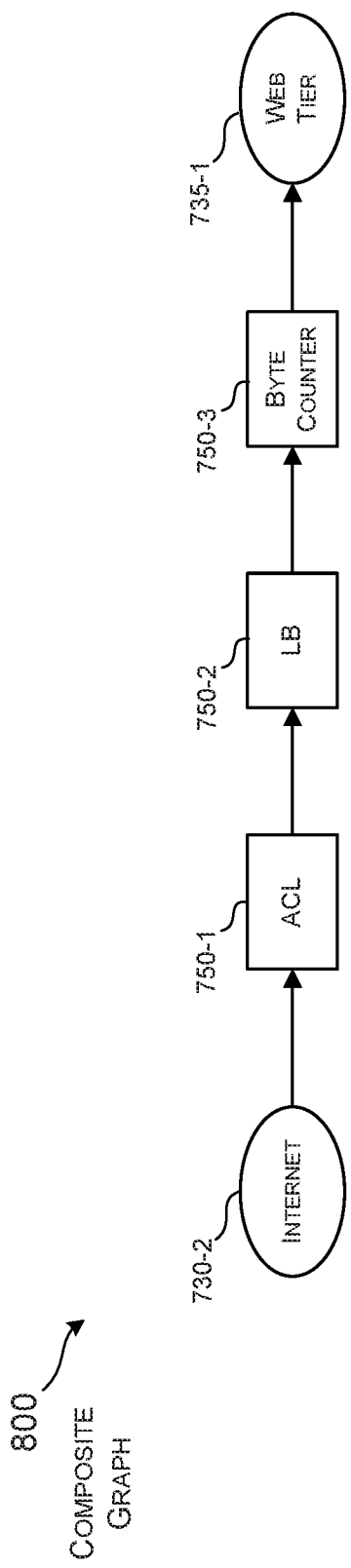

NETWORK POLICY GRAPHS

BACKGROUND

Software-defined networking (SDN) is a technique for implementing computer networking environments using software to control the configuration and allocation of networking hardware resources in the network. In such networks, the hardware (e.g., routers, switches, server, etc.) or virtual network and compute resources (e.g., virtual L2/L3 networks, virtual machines) can be programmed to allocate networking and computing resources according to the goals or policies of users such as operators, service providers, application developers, tenants, and other users.

BRIEF DESCRIPTION OF THE DRAWINGS

FIG. 8 depicts an example composite network policy graph.

DETAILED DESCRIPTION

Figure 1:
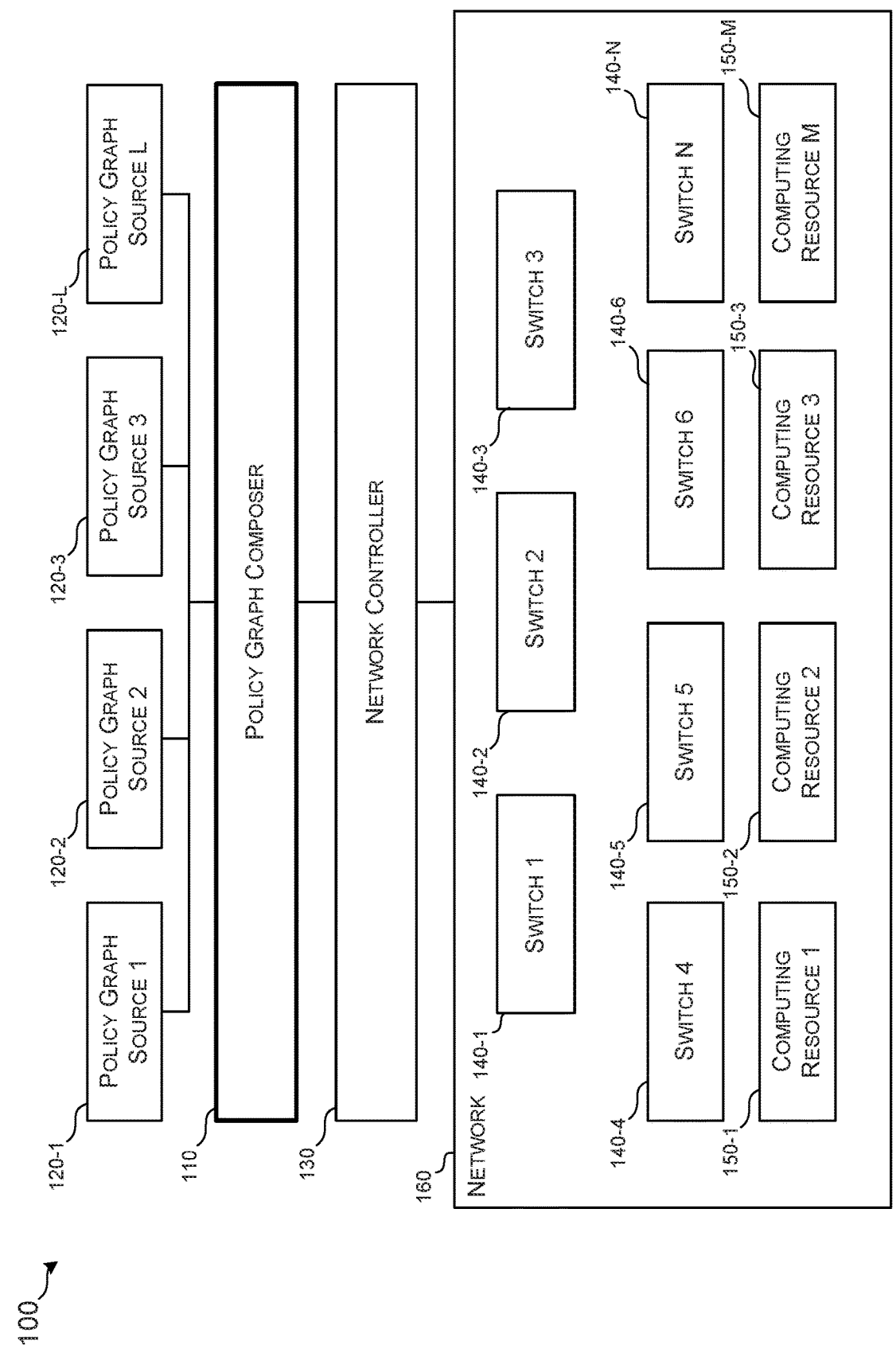
FIG. 1 is a schematic system diagram according to various examples of the present disclosure.

Software defined networking (SDN) provides network operators and other users with the ability to configure networking and computing resources flexibly and dynamically. In some implementations, the specific configuration of a network topology can be controlled by a network controller that implements various policies by programming the network hardware with specific rules. The policies or the rules can be expressed in one or more high-level or low-level network programming languages.

Examples of the present disclosure include a policy graph abstraction (PGA) that provides an intuitive visual methodology for defining network policies and improves the design and implementation processes of network programs. The PGA described herein includes a graph model and declarative language to specify complex policies and that can be used to generate corresponding network programs to support the goals of multiple SDN users without requiring information about or changes to the physical topology, the subnet, the VLAN, or any of the endpoint IP/MAC addresses in the network. Various examples of the PGA also enable semi-automatic composition of modular sub-graphs written by different types of SDN users, such as operators, tenants, SDN developers, and the like.

While conventional SDN enables the various SDN users to program the network, such systems require knowledge of and proficiency in various control application programming interface (APIs) and programming languages. Existing control APIs, such as OpenFlow, are designed to program low-level rule tables of individual network devices. Accordingly, such APIs are not well suited for programming the whole network as a single system.

Examples of the PGA in the present disclosure include a high-level API that can support simplified specification of user goals, expressed as network policies and network invariants, which can be used as intuitive expressions in a corresponding networking programming language. Other examples can also detect and resolve conflicts within a policy and between policies. The policies can be combined to create more complex composite policies so that the various users of the network need only be concerned with their own goals and policies.

In yet other examples, as described above, the API can include a policy graph composer to support various types of SDN users, such as SDN solution providers, enterprise ITs, cloud operators, tenants, application owners, SDN server/application developers, and the like, with various levels of flexibility and simplicity for programming a network.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, physical network, virtual network, and/or organizational changes can be made without departing from the scope of the present disclosure.

FIG. 1 illustrates a system 100 for programming and controlling a network 160, in accordance with various examples. The system 100 can include permanent or temporary connections to multiple policy graph sources 120. As used herein, the term "policy graph source" can be used interchangeably with the term "user" to refer to any SDN entity described herein (e.g., operators, service providers, etc.).

Each of the policy graph sources 120 can be connected to, or otherwise access, the policy graph composer 110. Using functionality provided by the policy graph composer 110, each of the policy graph sources 120 can design network policy graphs specific to its own corresponding goals. In some examples, the functionality provided by the policy graph composer 110 can include a graphical user interface with drag-and-drop features for selecting and designing visual representations of the graphs depicted in some of the accompanying drawings. In other examples, the functionality of the policy graph composer 110 can include a library, and/or an API for accessing a library, of previously designed network policy graphs. The API can also be used to create a new graph, or new graph components (nodes and path polices). In various examples of the present disclosure, the policy graph composer 110 can analyze the network policy graphs input by the various policy graph sources 120 to compose a composite network policy graph. The policy graph composer 110 can then convert the composite network policy graph to generate commands, or other control signals, that can be sent to the network controller 130.

The network controller 130, in response to the commands received from the policy graph composer 110, can program the various components of the network 160. As shown, network 160 can include multiple switches 140 and computing resources 150 connected to and in electronic communication with one another using various electronic communication media and protocols. As used herein, the term "switch" refers to any networking hardware that can be used to route data from one endpoint to another. Each computing resource 150 can include any type of function specific or general purpose computing hardware. Accordingly, as used herein, the term "computing resource" can refer to any computing device, such as a server computer, capable of instantiating applications, virtual machines (VMs), and other executable code. Similarly, the policy graph sources 120 and/or their corresponding input, the policy graph composer 110, and/or the network controller 130 can be implemented in any one or more of the computing resources 150 or other computing resource not shown.

In various example implementations, the policy graph sources 120, the policy graph composer 110, and/or the network controller 130 can be implemented as any combination of software, firmware, and hardware in a single or in multiple physical or virtual computer systems. In some examples, the software or firmware can be implemented as computer executable instructions stored on a non-transitory computer readable medium. Various examples of the present disclosure can be implemented or instantiated in one or more computer systems by executing the computer executable instructions in one or more computer processors. For example, the policy graph sources 120, the policy graph composer 110, and/or the network controller 130 can be instantiated in any of the computing resources 150 or in another computer system (not shown) coupled to the network 160.

Figure 2:
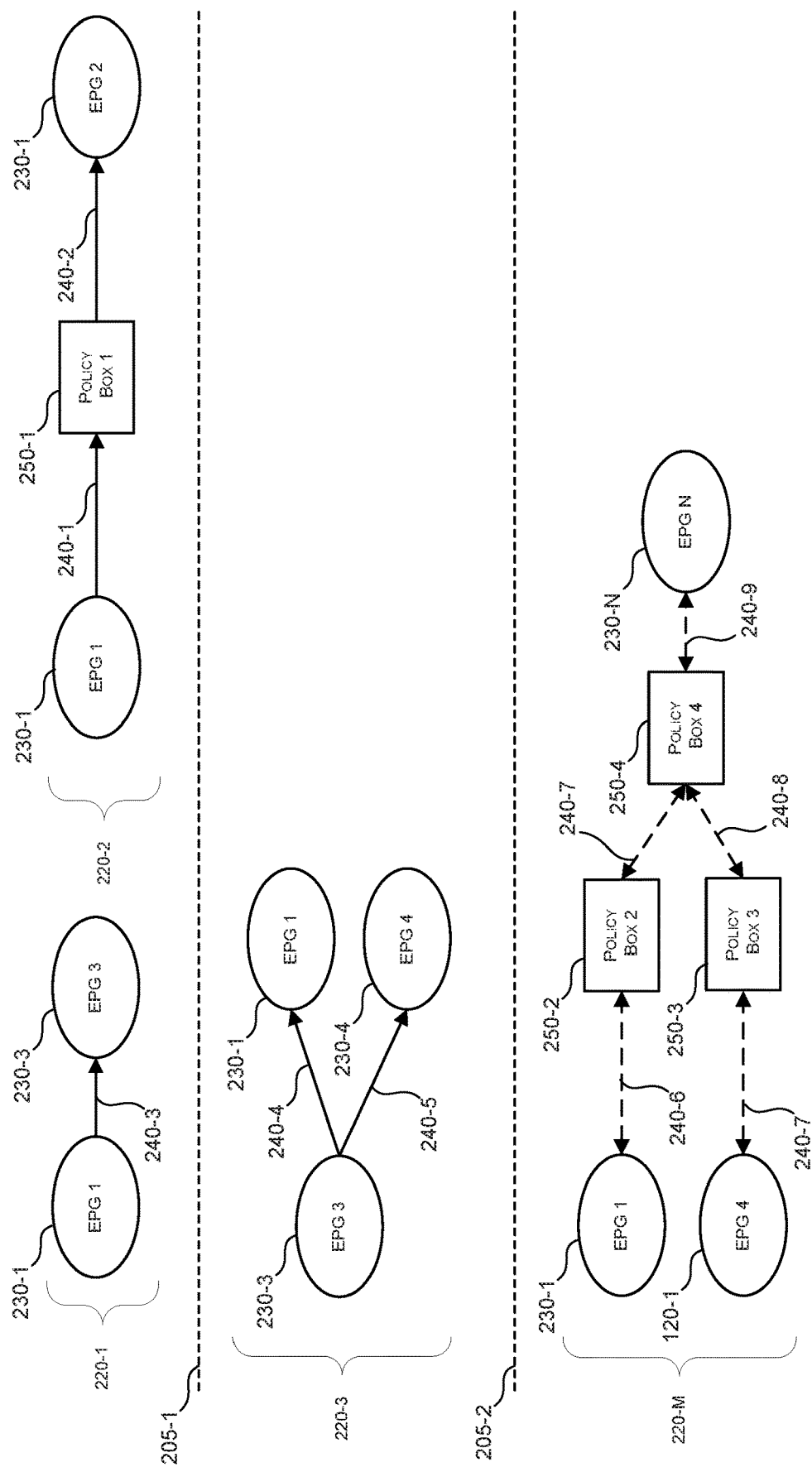
FIG. 2 illustrates example network policy graphs.

FIG. 2 illustrates several example network policy graphs 220 depicted using example implementations of the PGA model described herein. As shown, each one of the policy network graphs 220 can include at least one endpoint group (EPG) 230 connected to another EPG 230 by a path 240. The EPGs 230 are sometimes referred to as EPG nodes, and the paths 240 are sometimes referred to as edges. Such terminology is consistent with conventional description of graphs. In some examples, the EPGs 230 are connected to one or more other EPGs through paths 240 and/or a policy box 250. As depicted, each network policy graph 220 can be placed in or associated with a ranking or hierarchy expressed by the boundaries 205. A specific example organization of the hierarchy is described herein in reference to other example implementations.

Network policy graphs 220 can be defined using the PGA as an intuitive graph model to specify policies, requirements and service logic. Each network policy graph 220 can describe a logical topology between EPGs 230 and policy boxes 250. The term "endpoint group" or "EPG" refers to a group of arbitrary addressable (e.g., IP, MAC, subnet, VLAN, etc.) endpoints or a group of EPGs 230 that can perform a common logical role or share a common property. The term "policy box" refers to the functionality, or the visual representation of the functionality, used to implement network services such as firewall, monitoring, Network Address Translation, routing, load-balancing, etc. A policy box 250 can include a composition of multiple modular policy boxes. As shown, zero or more policy boxes 250 can be placed on directional paths 240 between EPGs 230.

Various examples of the present disclosure can include a network programming language that describes the behaviors and properties of policy boxes 250. The network programming language representations of the functionality and properties of the policy boxes 250 can be useful for detecting potential dependencies and conflicts among the network policy graphs 220 and for generating composite network policy graphs. In such implementations, the policy graph composer 110 can analyze component network policy graphs 220 that may be combined into the resulting composite network policy graph.

The policy graph composer 110 can detect policy conflicts and dependencies between the graphs 220 and automatically compose the graphs 220 into one complex network policy graph that satisfies the invariants specified in each individual network policy graph. The analysis of the conflicts and the composition of the composite network policy graphs can include analysis of the relationships (e.g., conflicts, dependencies, impacts, etc.) between policy boxes 250 of the network policy graphs 220 to be combined together on the same path in the composite network policy graph. The relationships can be used to automatically determine the right placement and order of the policy boxes 250 in the composite network policy graph and some of the relationships (e.g., conflicts) can be reported to users for attention or correction. In some examples, the policy graph composer can use the set relationships between EPGs and the domain relationships between EPGs and policy boxes to derive the order of the policy boxes requested by different policy graph sources.

Figure 3:
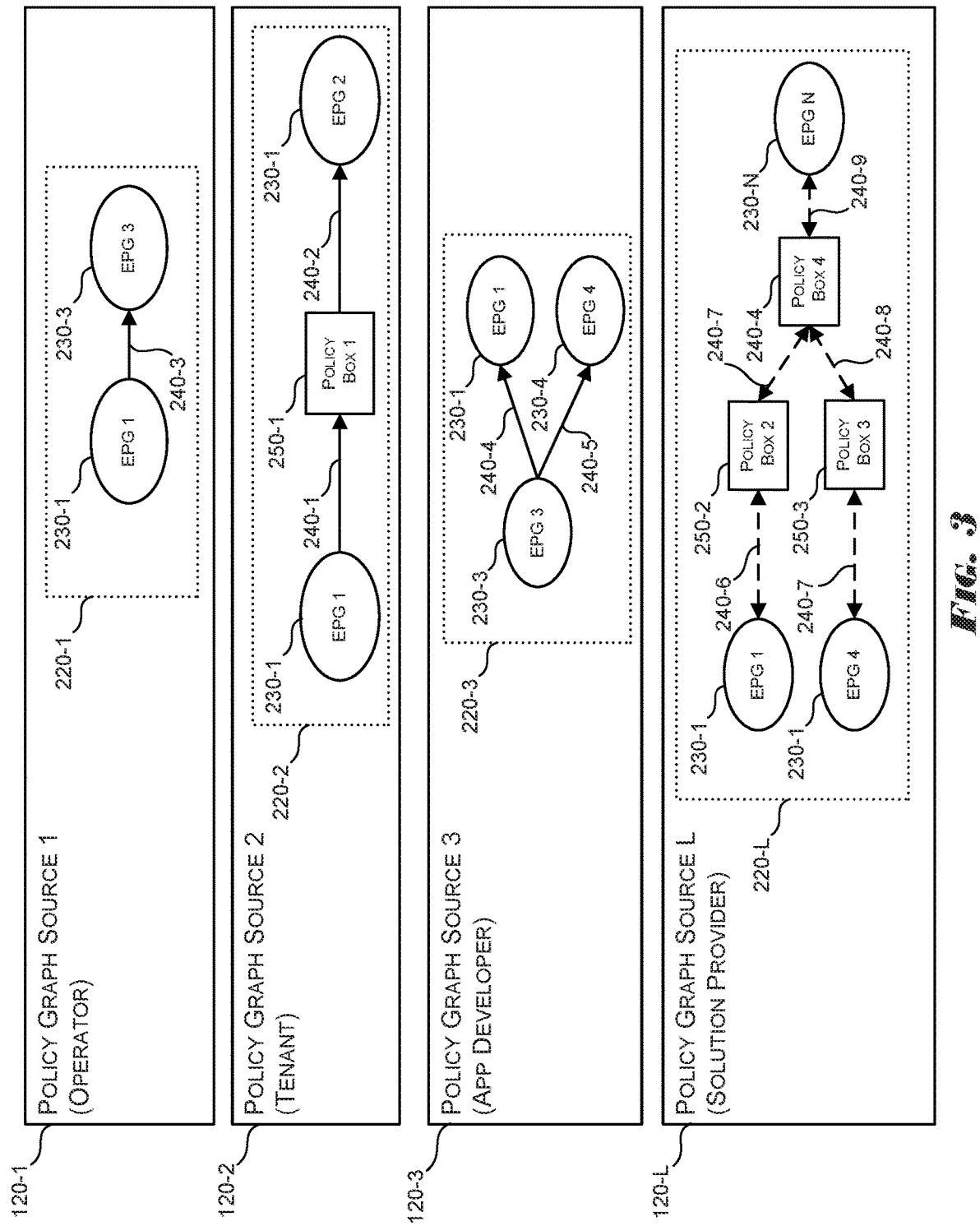
FIG. 3 illustrates example policy graph sources and corresponding network policy graphs.

In some example implementations, the PGA can consider a hierarchy of policy graph domains, as the domain separations are depicted as boundaries 205. Each network policy graph 220 can be associated with or originate from a corresponding policy graph source 120, as shown in FIG. 3. As depicted in FIG. 3, the network policy graph 220-1 is associated with the policy graph source 1 120-1 (e.g., an operator), while network policy graph 220-2 is associated with the policy graph source 2 120-2 (e.g. a tenant), network policy graph 220-3 is associated with the policy graph source 3 120-3 (e.g. an application developer), and network policy graph 220-4 is associated with the policy graph source 4 120-4 (e.g. a solution provider). Based on the associations between the network policy graph 220 and the corresponding policy graph source 120, the network policy graphs 220 may be processed or analyzed differently for composition into a composite network policy graph.

For example, a tenant of the network 160 can create network policy graphs in the tenant domain. The tenant may be an enterprise with various departments and each department can create graphs in corresponding departmental domains. The departments may in turn have multiple sub-departments and each of the sub-departments can create graphs in corresponding domains. Accordingly, in the hierarchy relationships among the domains in the graph domains, the tenant domain can be considered the parent of the departmental domains, which can in turn be considered the parents of sub-departmental domains, and so on.

In various example implementations of the present disclosure, the PGA can include directed network policy graphs 220 that can include EPG 230 nodes and/or policy box 250 nodes. Such directed network policy graphs 220 include indications of data flow directions between the nodes.

As described herein, circular/oval-shaped vertices represents EPGs 230 and can include any group of arbitrary addressable endpoints or a group of endpoints that perform a common logical role or share a common property. A user can create an EPG to represent a logical role without real endpoint identifiers. Endpoint identifiers such as IP, MAC, subnet, VLAN addresses can be given later through 'late-binding'. For example, an EPG 230 can represent a user-defined application component (e.g., web or database server, Lync server) or dynamic membership (e.g., current guest devices, Lync VoIP session, security-quarantined clients).

An EPG 230 can have mandatory and optional parameters. For example, service port numbers, Virtual Machine (VM) type, auto-scaling option, fault-tolerance level, IP ranges, etc. In some implementations, EPGs 230 in a graph do not have overlap by default, i.e., the intersection of any EPG pair is empty (no common endpoint). If EPGs 230 do overlap, their set relationship must be specified. For instance, an EPG A is a subset of an EPG B, or a tenant EPG is the union of web and database EPGs. The set relationships, including 'no overlap', can allow the system to analyze a graph and to compose multiple graphs, without requiring real endpoint identifiers to be given.

Various example implementations can include a 'shadow' EPG that can be defined in suitable scenarios, such as in a security service that defines two EPGs 230 as "normal hosts" and "quarantined hosts" and that maintains separate policies for each. When such a security service graph is combined with any other graph, the user can define a 'shadow' EPG 230 that can include both normal host EPGs and quarantined host EPGs and the shadow EPG may be composed with EPGs in the other graph, thus triggering composition of the composite graph.

The rectangular-shaped policy box 250 vertices can represent implementations of network services such as, but not limited to, load-balancing, firewalls, traffic engineering, billing, etc. In some implementations, a policy box 250 can be a minimal unit of service chaining and graph composition. Multiple policy boxes 250 can be chained together for service chaining. But during the composition of multiple network policy graphs 220, a chain of policy boxes 250 from one network policy graph 220 can be disconnected. The disconnected boxes can form a new chain in the composite network policy graph 220 together with other policy boxes 250 from other network policy graphs 220.

Extension of Network Programming Languages

In some example implementations, a policy box 250 can represent an abstract 'function' that takes a packet as input and returns a set of zero or more packets. In such implementations, a network programming language can be used to describe the function, behaviors, and properties, which can be used for conflict detection, resolution, graph composition and rule compilation. In various implementations, the Pyretic network programming language can be used. Pyretic is switch-centric and can use real IP/MAC addresses to implement network programs. Pyretic can be extended to write programs/policies regarding logical EPG parameters (e.g., 'web.ip' to indicate IP addresses of web EPG), before the actual IP addresses of web endpoints can be available.

Extended Pyretic can include extensions to the language that can be useful for PGA. Extended Pyretic can support "gray boxing", that can capture high-order behavior of a proprietary black box or a network policy box 250 running dynamic policies.

Dynamic policies have behavior that changes over time, according to the programmer's specification of an arbitrary internal state machine, which is difficult to analyze offline before deploying the program to the operational network. For example, a server load-balancing policy box 250 may select the destination server IP for a new client request in a round-robin manner or based on any per-server state information. An exact mapping between a client request to a specific server and the server becomes known only in run-time. Gray-boxing lets the user (load-balancing policy box 250 writer or an operator using the policy box 250) to specify the mapping behavior at a high-level without considering the actual mappings. For example:

match('dstip', web.virtual_ip)>>modify('dstip', web.real_ip}

In the above statement, web.virtual_ip is the virtual IP address used by clients to send requests to and web.real_ip is the set of real IP addresses of web server endpoints registered to the web EPG 230 at any given time. By using the set of real IPs, it is possible to capture the useful information that the destination IP of a client request message will be rewritten to one of the web server IPs. Examples of the present disclosure can use this high-order information for conflict detection and automatic graph composition, as described herein.

Like gray boxing a dynamic policy, gray boxing can be useful to capture the high-level behavior of proprietary middle box applications, which can be black boxed (e.g., the exact internal behaviors are unknown). For example, a DPI-based Intrusion Prevention System (IPS) policy box can drop certain packets based on packet payloads or any proprietary algorithm for detecting DDOS attack. According to various implementations, a user can provide a gray-box version of the IPS box as the statement:

select(drop, identity)

In such statements, identity is the Pyretic action for 'allow', and select(A1, A2 . . . ) indicates that one of the specified actions (A1, A2 . . . ) is selected, with its selection logic unknown, and applied to its input packet. The select( ) in extended Pyretic can support gray-boxing. If it is known that the IPS box will block some endpoints from the 'client' EPG, its gray-box can be represented by:

match('srcip', client.ip)>>select(drop, identity)

In this statement, client.ip indicates the set of IP addresses of client EPG.

Figure 5:
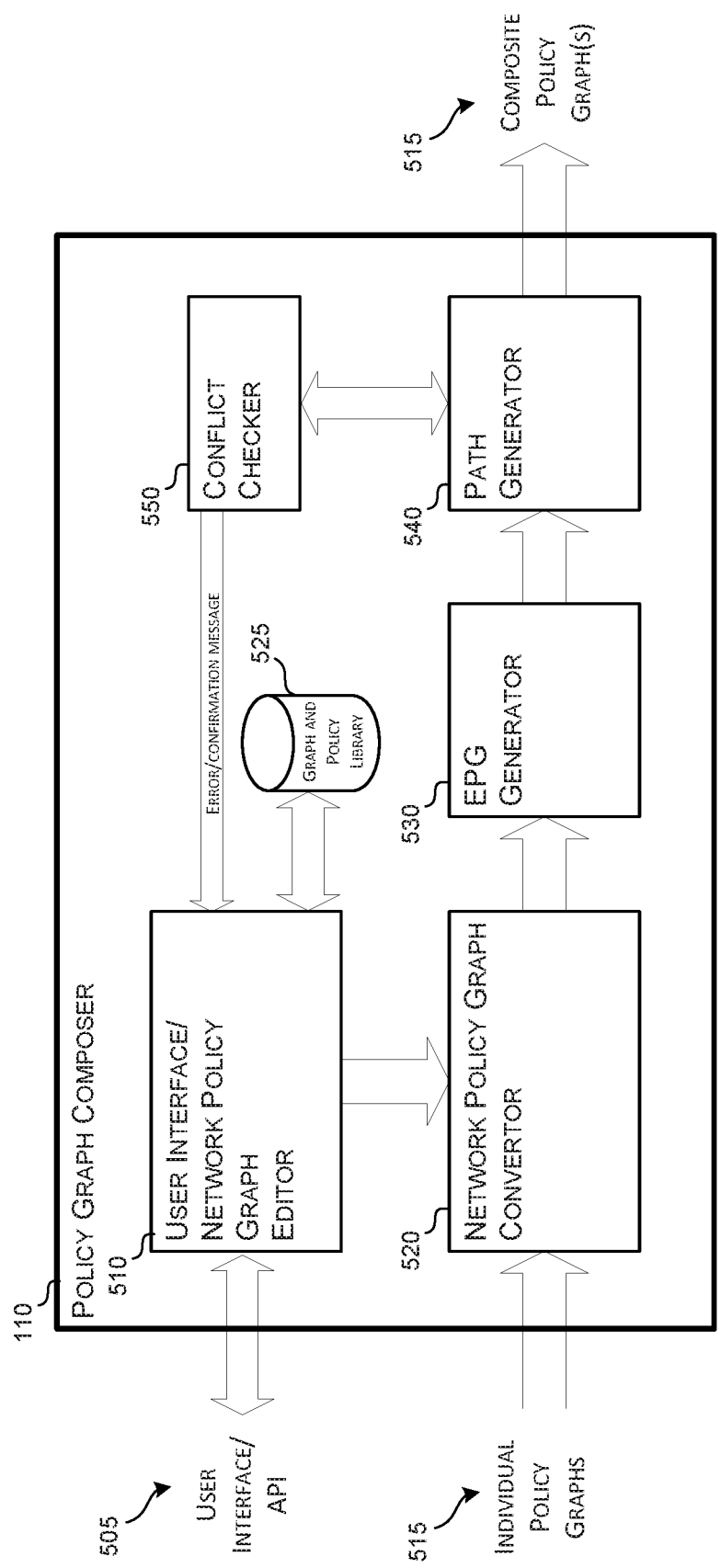
FIG. 5 depicts an example policy graph composer.

Examples of the present disclosure can be implemented as a policy graph composer 110 in an SDN system 100, as depicted in FIG. 1. FIG. 5 illustrates one example implementation of the policy graph composer 110. In particular, FIG. 5 illustrates the various components of the policy graph composer 110 and the relative dataflow to give context to the other implementations described herein. In one example, the policy graph composer can include a user interface/network policy graph editor, or a user graph editor 510, that includes functionality for providing a user interface and/or an API 505 to the various users of the network 160. The user graph editor 510 can provide a graphical user interface that can be used to drag-and-drop component EPGs 230, paths 240, and policy boxes 250 to create network policy graphs and/or express the goals of the particular user.

In related implementations, user graph editor 510 can also include functionality for receiving or retrieving previously defined network policy graphs from the graph and policy library 525. In such implementations, the previously defined network policy graphs can be used as components of network policy graphs defined by a user using the user interface/API 505.

The policy graph composer 110 can also include a policy graph converter 520. The policy graph converter 520 can receive network policy graphs from the user graph editor 510 and/or individual policy graphs 515 from other sources (e.g., an external graph library or database). In various examples of the present disclosure, the process of generating a composite network policy graph can begin with the policy graph converter 520 converting multiple component network policy graphs into appropriate network programming language statements. The details of the conversion of the network policy graphs to a network programming language are discussed in more detail below.

The policy graph composer 110 can also include an EPG generator 530. The EPG generator 530 can include functionality for analyzing the relationships between the various EPGs 230 in the component network policy graphs. For instance, the EPG generator 530 can analyze the overlap of the EPGs 230 by determining the intersection and unions on a pairwise basis for up to all of the EPGs 230 in component network policy graphs. The EPG generator 530, based on the analysis of the relationships between the EPGs 230, can generate, or otherwise determine, the resulting composite network policy graph.

The path generator 540 of the policy graph composer 110, can include functionality for determining the paths in the resulting composite network policy graph. By analyzing the relationships between the EPGs 230 and the original paths 240 and policy boxes 250 in the component network policy graphs represented in the network programming language provided by the policy graph converter 520, and the analysis performed by the EPG generator 530, the path generator 540 can determine the configuration of the paths and policy boxes in the resulting composite network policy graph.

In related implementations, the policy graph composer 110 can include a conflict checker 550 to verify and determine the dependencies and conflicts between the policy boxes in the resulting composite network policy graph. In the event that the conflict checker 550 detects a conflict, an error message/confirmation message can be sent to the user graph editor 510 and/or user interface/API 505 to alert a user to take corrective action. If the conflict checker 550 does not detect any conflicts, then the path generator 540, or some other component of the policy graph composer 110, can compose the composite network policy graph 515 and provide it to another component of the system 100, such as the network controller 130 to program the network 160.

Figure 6:
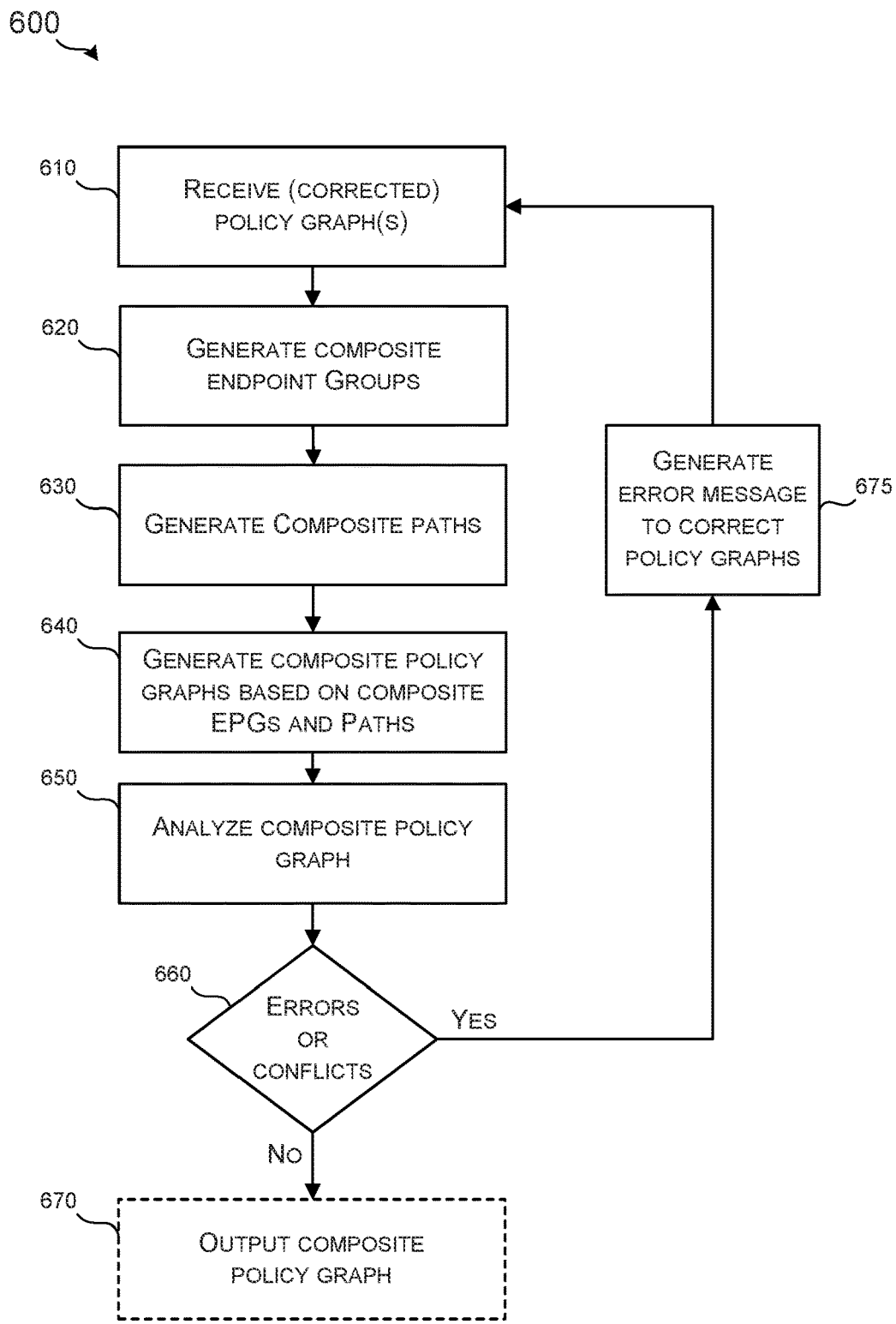
FIG. 6 is a flowchart of a method for generating composite network policy graphs, according to examples of the present disclosure.

FIG. 6 depicts a flowchart of a method 600 for generating composite network policy graphs, according to examples of the present disclosure. The method 600 can begin when the policy graph composer 110 receives one or more network policy graphs, at box 610. In some implementations, receiving the network policy graphs can include converting the network policy graphs into a network programming language syntax. The conversion of network policy graphs into a network programming syntax is described in more detail below.

At box 620, the policy graph composer 110 can generate EPGs for the composite network policy graphs. In such implementations, the policy graph composer 110 can analyze the relationships between the EPGs 230 to determine the specific EPGs to include in the resulting composite network policy graph. The details of the EPG generation are described in more detail below.

At box 630, the policy graph composer 110 can generate paths for the resulting composite network policy graph. The composite paths can include a combination of the paths and/or the policy boxes defined in the component network policy graphs. Additional details of path generation are described in more detail below.

At box 640, the policy graph composer 110 can generate a composite policy graph based on the composite EPGs and paths. Additional details are described in more detail below.

At box 650, the policy graph composer 110 can analyze the composite policy graph to detect or determine dependencies and conflicts among the EPGs, paths, and policy boxes of the composite policy graph. At the termination 660, if errors are complex, then the policy graph composer 110 can generate an error message to correct the policy graphs, at box 675. In some implementations, the error message can prompt a user to correct one or more of the input network policy graphs or to supply a new network policy graph. Once the updated or corrected network policy graph is received by the policy graph composer 110, boxes 610 through 660 can be repeated.

If, however, at determination 660, no conflicts or errors are detected, then the policy graph composer 110 can output the composite policy graph to the network controller 130. Outputting the composite network policy graph can include converting the composite network policy graph into a network programming language. The network controller 130 can then use the composite network policy graph to program the network 160.

Additional illustrative examples and details of EPGs 230, network policy graphs, and the functions and actions represented by the boxes in FIG. 6 are discussed below.

Endpoint Groups and Network Policy Graphs

Figure 7:
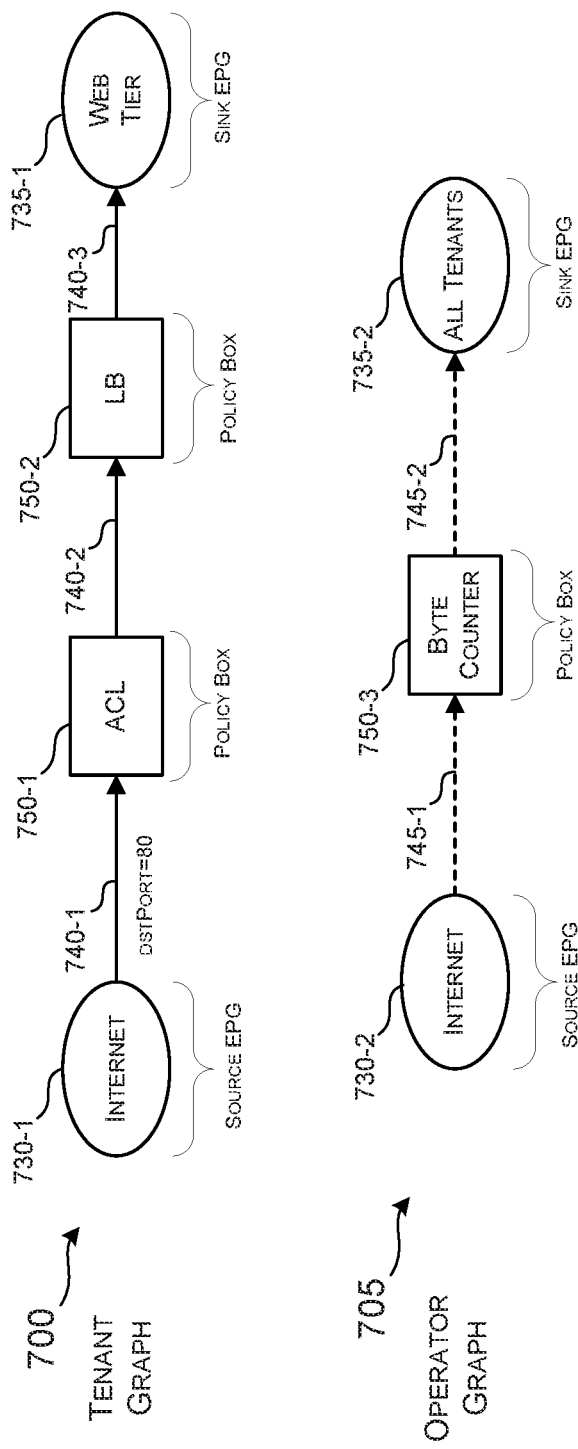
FIG. 7 depicts two example network policy graphs associated with specific SDN entities.

An EPG 230 in a network policy graph 220 can be classified as a source or sink of network traffic while a policy box 250 neither creates nor consumes traffic by itself, such as, for example, the source EPG 730 and sink EPG 735 in FIG. 7.

The EPGs and policy boxes nodes in a graph can be connected through directed edges, forming directed paths. A directed 'path' is defined between a source EPG and a sink EPG. A path starts from the source EPG 230, traverses zero or more policy boxes 250 and ends at the sink EPG 230. A cycle is allowed, for example, when a web EPG sends to a database EPG through a policy box A while the reverse traffic from DB to web EPG is traversing policy boxes B and C. An EPG 230 may have a self-loop path representing traffic among endpoints of that EPG, e.g., synchronization between database server (DB) VMs.

In some implementations, no communication is allowed between vertices, by default (e.g., default 'deny' rule). A solid directed edge 240 can enable communication as specified by filter attributes on the edge classifier, e.g., label 'UDP, dstport 53' allows only UDP traffic with destination port number 53 on that edge, thus implementing security whitelisting. Another default security measure can include a rule that an outgoing edge from a source EPG 230 constrains the source IP addresses allowed on that edge 240 only to the IPs of the source EPG 230 endpoints. An incoming edge 240 to a sink EPG 230 can also limit the dst IP to the sink EPG 230 endpoints' IPs. Such default srcIP/dstIP constraints may not be applied to an EPG 230 with L3 forwarding, such as virtual router. By default, a security attribute can be stateful, such that responses to allowed TCP traffic in the direction of the edge can be allowed in the reverse direction as well.

A chain of solid edges 240 connecting a source EPG 230, through a set of policy boxes 250, to a sink EPG 230 is called a 'solid path'. A solid path has two implications. Firstly, the solid path can include security whitelisting as described above. Secondly, the solid path can include a path requirement meaning that the allowed communication from the source to the sink must traverse the policy boxes on that path.

Some users, such as network operators, may want to impose only the path requirement without explicitly allowing any communication. A 'dotted path' in a network policy graph 220 connecting a source EPG to a sink EPG, represents such a path requirement without whitelisting. Such path requirements (e.g., dotted paths in an operator graph) can be activated when combined with solid paths of other network policy graphs 220 (e.g., tenant graphs).

Conversion of Network Policy Graphs

Figure 4:
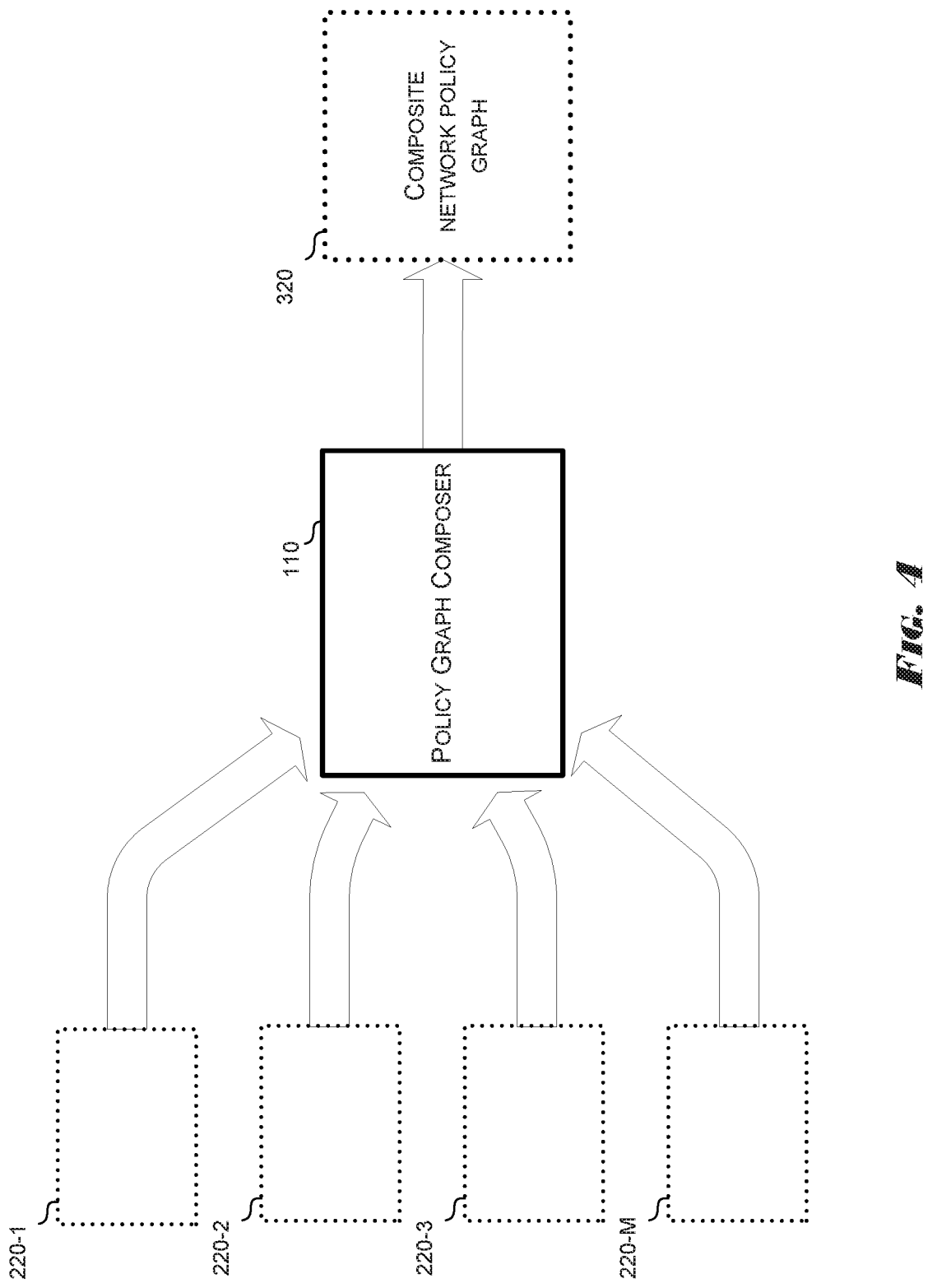
FIG. 4 illustrates a data flow of network policy graphs into a policy graph composer to generate a composite policy graph, according to various examples of the present disclosure.

As described herein, multiple network policy graphs 220 can be input into the policy graph composer 110, as depicted in FIG. 4 and described in reference to FIGS. 5 and 6. The policy graph composer 110 can analyze the various aspects and properties of each of the input network policy graphs 220 to compose and generate a composite network policy graph 320. In some example implementations, to generate a composite network policy graph, the policy graph composer 110 can first convert the component network policy graphs 220 into a high-level network programming language, such as Pyretic or extended Pyretic, described herein.

The behavior of the sequential composition ('>>') operator in Pyretic is to pass all the packets output from one Pyretic policy to the next Pyretic policy in sequence. In various implementations, all of the output packets of one policy box 250 can be input to the next policy box 250 in the path 240. The sequential composition operator can be used to express a solid edge from the graph. A new policy box 250 can be created to capture the whitelisting parameters provided as edge classifiers on the solid edge and added to the path 240. A source EPG, the policy boxes 250 and a sink EPG can be mapped into policy objects. The sequential composition operator can be added between each successive pair of policy objects.

For path requirement graphs, the '>' in extended Pyretic can be used. The conversion procedure is similar. The source EPG, the policy boxes 250, and the sink EPG can be mapped into policy objects with the path requirement operator connecting them.

In one example, the solid line graph 700 in FIG. 7 can be expressed in extended Pyretic as:

Internet>>ACL>>LB>>Web tier

The path requirement graph 705 from FIG. 7 can be expressed as:

Internet>Byte Counter>All tenants

Automatic analysis and composition can be improved based on knowledge of user goals for a policy box 750. Accordingly, users can explicitly specify 'match' filters or 'identity' in conjunction with any kind of action being performed.

Example Composition of Composite Network Policy Graphs

The policy graph composer 110 can initiate composite network policy composition under various circumstances. For example, composite network policy graph composition can be triggered whenever a new network policy graph 220 is created or an existing graph is updated at any level of a graph hierarchy. For example, the method 600 of FIG. 6 can be initiated whenever a trigger is detected.

The network policy graph created or updated can be automatically combined with the graphs below and above in the hierarchy by determining the EPG relationships, as described herein. Graph composition can also be triggered by a simple drag-and-drop GUI action that triggers merging of a service/status EPG (e.g., security-contaminated vs. security-clean) and a tenant/network EPG. In such scenarios, the security service graph and the graph containing the tenant/network EPG can be combined.

One example can include the combination of two network policy graph $G_1$ and $G_2$, such as 700 and 705. In similar examples, the combination composition of three or more network policy graphs can be achieved by repeating the two-graph composition, described herein.

The combination of two network policy graphs, $G_1$ and $G_2$, can begin by identifying set relationships between EPGs from the two graphs. The EPGs from the same graph may not overlap, as described herein. The relationships between EPGs across network policy graphs G1 and G2 can be derived by the graph/EPG hierarchy, accessed or determined by the policy graph composer 110 or by one of the policy graphs sources 120. The policy graph composer 110 may require the policy graphs sources 120 to provide the EPG set relationships at the time of composition.

In scenarios in which there is no overlap between any pair of EPGs, one from network policy $G_1$ and the other from network policy $G_2$, the two network policy graphs can co-exist without any conflict or interaction on the logical topology. In such implementations, all vertices and edges from network policy G1 and network policy G2 can be copied directly to the final composition network policy graph $G_3$ as they are. This is a special case of examples described below.

Generating EPGs for Composite Network Policy Graphs

In scenarios in which there are overlapping EPGs between the two network policy graphs, the composite network policy graph $G_3$ can be composed by analyzing the relationships, intersections, and unions between the EPGs. In one example, all paths in both network policy graphs can be assumed to be solid, thus implying both security whitelisting and path requirement.

To create the composite network policy graph $G_3$ the existing EPGs in the network policy graph can be split. When two EPGs, E1 from $G_1$ and E2 from $G_2$ overlap (E1∩E2 !=Ø), The union, E1 ∪E2 can be into one, two or three resulting EPGs based on the Venn diagram between E1 and E2. The resulting EPGs can be assigned to G3.

There are four possible Venn diagram relationships between E1 and E2. (1) E1==E2: $G_3$ will have only one EPG E1(=E2), from E1 and E2; (2) E1 ⊂E2: $G_3$ will have two resulting EPGs, E1 and E2−E1; (3) E1 ⊃E2: $G_3$ will have two resulting EPGs, E1−E2 and E2, and (4) E1 and E2 partially overlap: $G_3$ will have three EPGs: E1−E2, E1 ∩E2 and E2−E1.

The EPGs appearing only in either G1 or G2, thus having no overlapping EPG in the other graph, can be copied directly to G3. In some examples, once the new EPGs are created from the splitting process, the paths for the composite network policy graph can be created as described herein.

Path Generation

Generating the paths between the EPGs created in G3 can define an EPG X in G3 as either 'mixed' (X=E1 ∩E2) or 'pure' (X=E1−E2, E2−E1, or a direct copy of non-overlapping EPG). A directed path from EPG X to EPG Y (X→Y) is added to G3 in one of the following scenarios.

In one scenario, both X and Y are 'pure' EPGs, in that case, X (Y) appears only in G1 or G2, but not in both. X→Y is added to G3 if X and Y appeared in the same graph (either G1 or G2) and the communication specified by the path X→Y is allowed in the original graph ($G_1$ or $G_2$). X→Y has the same intermediate policy boxes specified in the original path allowing the communication.

In another scenario, X is pure and Y is mixed. X appears in only G1 or G2 and Y appeared in both G1 and G2. In this scenario, if G3 is composed by the AND operator, X→Y is not added at all. X→Y is added only if G3 is composed by OR operator (i.e., $G_3=G_1|G_2$) and the communication specified by the path is allowed in either $G_1$ or $G_2$. X→Y has the same intermediate policy boxes specified in the original path allowing the communication.

In yet another scenario, both X and Y are mixed. X and Y appeared in both G1 and G2. In this case, X→Y is added only if the communication specified by the path is allowed in both $G_1$ and $G_2$. In other words, by denoting X=S1∩S2 and Y=D1∩D2 (S1/D1 in G1 and S2/D2 in G2), X→Y is added only if S1→D1 exists in G1 and S2→D2 exists in G2. By denoting B1 as the sequence of policy boxes on S1→D1 and B2 as the sequence of policy boxes on S2→D2, the path X→Y will have the union of B1 and B2 as a result of the 'path merging' logic, described herein. Note that it is not required to differentiate between AND vs. OR operators when both X and Y are 'pure' EPGs or when both X and Y are mixed.

When composing multiple graphs into one, the path between the overlapping parts of source EPGs and the overlapping parts of sink EPGs can include all the network policy boxes from the constituent graphs. However, automatically merging policy boxes from different graphs onto a single one can be challenging because an improper ordering of policy boxes can lead to the violation of invariants of any of the individual network policy graphs.

Path merging can be achieved using two simple graphs as shown in FIG. 7. For example, the goal of the policy graph source that authored network policy graph 705 is to count the number of bytes coming from the Internet to each machine of every tenant. This is specified in network policy graph 705 by creating a Byte Counter policy box 750-3. Internet EPG 730-2 and All Tenants EPG 735-2 are the source and sink EPGs respectively in the network policy graph 705. The tenant network policy graph 700 includes the Internet EPG and Web tier EPGs and policy boxes ACL 750-1 and LB 750-2. The ACL policy box 750-1 only allows packets with destination IP address of the sink EPG's virtual IP address and destination port equal to 80 to pass through. A separate policy box may also have been created for the same. The LB policy box 750-2 modifies the packets' destination IP address from the sink EPG's virtual IP address to the real IP addresses of machines belonging to the sink EPG.

The example EPGs 730 from the network policy graphs 700 and 705 have the following relationships. Source EPGs 730-1 and 730-2: Internet=Internet. Sink EPGs 735-1 and 735-2: All tenants ⊃ Web tier. The overlap in both source EPGs 730 and sink EPGs 735 can mean that both paths can be merged (e.g., policy boxes 750 from both graphs 700 and 705 can be placed in a single path). The ordering of policy boxes 750 is important. An improper order of policy boxes 750 may fail to comply with the goals of the policy graph sources 120. For example, if the Byte Counter policy box 750-3 is placed before LB policy box 750-2 after path merging, it would count bytes by the virtual IP Address of the Web Tier EPG 735-1. Such a result would not comply with the goals of the policy source 120's goals (e.g., to count bytes by the tenant's machines' real IP Addresses). To determine the correct order of the policy boxes 750, the policy graph composer can systematically analyze the policy boxes.

To determine the overall ordering of policy boxes 750 from two network policy graphs, the policy graph composer 120 can perform a pairwise analysis of each pair of policy boxes—one from either graph. The outcome of the pairwise analysis of two policy boxes can provide a suggestion for an initial ordering between them. It also reveals any policy conflicts and the implications of the suggested order.

In some example implementations, users can declare some EPGs or EPG-to-EPG paths as 'exclusive' to prevent policies written for such EPGs or EPG pairs from being altered by other policies during the composition/merging process. For example, a designation of an exclusive EPG can indicate that no more edges be added or connected to a particular EPG node. A designation of an exclusive path can indicate that the path may not be merged with any other path.

Expressing Policy Boxes as Match-Actions Rules

For the pairwise analysis, each policy box written in a high-level programming language such as Pyretic can be converted into a prioritized set of match-actions rules. A rule can include a match filter that defines the protocol fields and values used to distill the packets that can be evaluated by this rule and a set of actions that are to be performed on those packets. Input Packet Space (IPS) can be defined at a rule as the finite set of all packets that are available at the rule to be evaluated by its match filter. IPS can be governed by the various higher priority rules belonging to the same policy and the match filters used by them. The match filters themselves create a Match Space (MS) which is the set of all packets that match on the filter parameters. The intersection of the IPS at a rule and its MS gives the Effective Match Space (EMS) which is the set of all packets that the actions of the rule are performed upon. Finally, the Output Packet Space (OPS) is the set of all packets output from the rule after performing all the actions.

The logic for conversion of policies to match-actions rules is borrowed from Pyretic with some modifications. The modifications being a more precise representation of some of the actions like count_bytes, count_packets which are all generically represented by the FwdBucket action in Pyretic. Note that the Byte Counter's match filter contains the value web.real_ip rather than all_tenants.real_ip. This is because, the purpose of the analysis is to determine the composite path for the overlapping parts of the EPGs of the two graphs. In this case the overlap is only on the sink EPG and the overlapping part is the entire Web tier EPG itself. Thus, references to All tenants EPG in the operator graph rules can be replaced with Web tier EPG.

Expressing the policies in terms of simple [match→action] rules abstracts away the complexities of the programming language syntax and provides insight on how different packets can be handled by a policy. This renders it ideal for comparing the behaviors of two different policies and determining their relationship.

The conversion procedure from a policy to one or more rules can be illustrated using the ACL policy box 750-1 as an example. The policy specified in the ACL policy box 750-1 may be to execute two rules in sequence. For example, the first rule, Rule 1, may drop every packet that does not have a destination IP address equal to the Web tier EPG's virtual IP address. The second rule, Rule 2, may drop every packet that does not have the destination port field set to 80. The two filters directly map to the two rules:

Rule 1 as match: ('dstip', web.virtual_ip)→set([identity]) and

Rule 2 as match: ('dstport', 80)→set([identity])

The action part of the filter rules, (i.e., set([identity])), indicates that the only action to be performed by this rule is to simply allow the packets to pass-through. Since the rules have the same action and the match filters are anchored on different fields, the two are combined into a single rule as:

match: ('dstip', web.virtual_ip) & ('dstport', 80)→set([identity])

The ACL policy may further imply that any packet not matching the two filters should be dropped, as expressed by the lower priority rule:

identity→set([ ])

In this rule, the match filter is set to "identity" which indicates all packets. Since higher priority rule already matches the packets with destination IP address of Web tier EPG's virtual IP address and destination port of 80, the identity here effectively matches the packets that were not matched by the higher priority rule. Thus, we have the following prioritized rules $R^{ACL}_1$ and $R^{ACL}_2$ for the ACL policy box 750-1:

$R^{ACL}_1$—match: ('dstip', web.virtual_ip) & ('dstport', 80)→set([identity])

$R^{ACL}_2$—identity→set([ ])

To further illustrate the abstraction of the policies as rules, the policy boxes 750-2 and 750-3 of the network policy graphs 700 and 705 of FIG. 7 are represented as example match-action rules. For example, Byte Counter policy box 750-3 can be represented by rules rule $R^{BC}_1$ and rule $R^{BC}_2$, where rule $R^{BC}_1$ can be defined as:

match:('dstip', web.real_ip)→action:set([count_bytes: {'group_by': ['dstip']}]), and $R^{BC}_2$ can be defined as:

identity→set([ ]).

For LB policy box 750-2 represented by rules $R^{LB}_1$ and $R^{LB}_2$, rule $R^{LB}_1$ can be defined as:

match: ('dstip', web.virtual_ip)→set([modify: ('dstip', web.real_ip)]), and $R^{LB}_2$ can be defined as:

identity→set([ ]).

Analyzing the Rules for Dependencies and Conflicts

Once the rules corresponding to the policy boxes are define, the policy graph composer can analyze the rules to characterize how they might behave under operating conditions. To illustrate the analysis, example policy boxes, $P_a$ and $P_b$, are considered. Analysis of the constituent rules of can determine how the policy boxes $P_a$ and $P_b$ handle any given packet. Each rule in $P_a$ can be compared with each rule in $P_b$ to identify the existence of dependency, conflict, and redundant type relationships.

A dependency exists from one rule to another if the former rule's actions creates a packet space that is fully or partially matched by the latter rule. As such, there is a dependency from rule $R_a$ (of $P_a$) to rule $R_b$ (of $P_b$), if the pre-condition that $OPS(R_a)$ overlaps with $EMS(R_b)$ is true (i.e., $OPS(R_a) \cap EMS(R_b) \mathrel{!}= \emptyset$), and $R_a$ contains a modify action that creates a region overlapping with $EMS(R_b)$.

A conflict exists if, for the same packet space, the two rules perform actions that conflict with each other. All combinations of actions are considered conflicting except the following for drop-drop, identity-identity, identity-count and count-count. Thus, rule $R_a$ from $P_a$ conflicts with rule $R_b$ from $P_b$, if the pre-condition $EMS(R_a)$ overlaps with EMS $(R_b)$ is true and the actions of $R_a$ and $R_b$ are conflicting. When analyzing two rules, dependencies can be checked first. Conflicts may be checked only if a dependency relationship is not found between the two rules.

A redundancy exists if, for the same packet space, the two rules perform the same action. If two boxes have redundant rules, this may mean one box is performing a subset of the other box, including the case when two boxes perform the identical set of rules. Only one of the two boxes may be chosen to be used in the merged path, for example, by choosing the box that includes a larger set of rules.

Analysis of Composite Network Policy Graphs

The output from the rule analysis stage can be analyzed to provide the final suggestions for policy boxes order and/or user alerts for any implications (e.g., conflicts, dependencies, etc.) of the suggested order. Such analysis can include analysis of the individual relationships identified among the rules of the policy boxes to generate the suggested orders and the corresponding implications.

The policy graph composer 120, or the conflict checker component 550, can assign scores to the different relationships based on how the pre-condition of the relationship was satisfied. If the pre-condition was satisfied with an exact match of the participating packet spaces, the corresponding relationship is assigned a high score. On the other hand, if the pre-condition was satisfied due to the presence of a low priority identity rule, the corresponding relationship is assigned a low score. Intermediate scores can be assigned based on the number of protocol fields that have the same value across the two participating packet spaces with the score being higher for higher number of matching fields.

The reasoning behind the score assignment logic is that more numbers of directly matching protocol fields reflect the user intention directly. Whereas a low priority identity rule, for example, is typically a by-product of other policies expressed by the user and thus they also tend to yield a larger number of conflicts.

Once the weights have been assigned to the various relationships, policy graph composer 120, or the conflict checker component 550, can check for any 'dependency' relationship among the list of relationships provided as input.

If there is a single dependency relationship with the highest weight, the policy box with the rule that is dependent on the other rule is placed after the policy box containing the other rule. If there are multiple dependency relations with the highest weight and all of them mutually agree upon the placement of the policy box with respect to the other policy boxes, the corresponding order is used. Mutual agreement is reached when the placement of the policy box does not violate its dependency relation with any other policy box in the graph. If there are multiple dependency relations with the highest weight and there is a dispute about the ordering between them, then no suggestion can be made by the analyzer. The analyzer thus proceeds to compute all possible orders and indicate the implications of each order. If there are no dependency relations in the list of relations, then the policy graph composer 120, or the conflict checker component 550, computes the different possible orderings and provides the implications for each order. To gather implications, the analyzer simply places the policy boxes in the determined order and checks the relations if they still hold at the new order.

The suggested order between two policy boxes, from one or more dependency relations, tells only the relative order between the two and may not tell the absolute placements of them in the final merged path having all policy boxes from the two original paths.

To determine the absolute placements of all the policy boxes, a dependency graph can be constructed in which the two policy boxes with a 'dependency' relationship are connected via a directed edge: the box creating packet space is a parent node and the other box consuming (matching) the packet space is a child node. The directed edges in the two original paths also exist in the dependency graph. Topological sorting of the policy boxes can be performed to determine the final sequence of policy boxes for the merged path. A dependency graph may have many valid topological sorts. The sort with the higher-weight dependency boxes more closely placed can be chosen. Topological sorting can find a valid sequence only for a directed acyclic graph (DAG). If there is a cycle (e.g., A→B→C→A in the dependency graph), then it can be determined if the order of two boxes from an original graph (e.g., ACL and LB from the Tenant graph) can be altered by checking if the altered order generates the same behavior/invariant with the original order.

The final ordering suggestion and the corresponding implications are provided to the user. For the example of operator graph 705 and tenant graph 700, a single dependency relationship exists which also happens to be of the highest weight since the pre-condition is satisfied by an exact match of the OPS of $R^{LB}_1$ and the EMS of $R^{BC}_1$. Thus the policy graph composer 120 can suggest that the Byte Counter policy box 750-3 be placed after the LB policy box 750-2. Thus, the final composite network policy graph 800 output by the policy graph composer 120 is depicted in FIG. 8 along with the implications of the suggested order for user attention. In the particular example illustrated in FIG. 8, In addition, the hierarchical domain relationship among the policy boxes, the EPGs and the graph sources can be used to determine the order of policy boxes in the merged path. For example, operator graph 705 can have a security firewall (FW) policy box (not shown) instead of Byte Counter policy box 750-3 and the FW box blocks DDoS attack traffic from the Internet to All Tenants 735-2. Because the Web Tier EPG 735-1, ACL policy box 750-1 and LB policy box 750-2 all belong to a sub-domain (Tenant 1) of the All Tenants domain of the Operator graph 705, the ACL policy box 750-1 and LB policy box 750-2 can be placed after the resulting FW box in the composite graph so that the FW box can operate on the traffic flowing towards the Tenant 1 domain including the ACL and LB boxes.

The analysis on the policy box chain can also detect possible human or systems errors without composing the composite policy graph. In some examples, each the policy box chain and/or each individual policy graph can be analyzed to detect errors before or after the composite policy graph is composed. Analysis of any detected errors can inform the policy graph composer 110 or a user as to how the errors can be corrected, either manually or automatically. For example, if ACL policy box 750-1 is misconfigured to only allow packets with destination IP address of the sink EPG's real IP address, packets directed toward the sink EPG's virtual IP address would be incorrectly dropped. An ACL rule ($R_a$) that drops the packets with the virtual IP address would conflict with a LB rule ($R_b$) that modifies the packets' destination IP address from the virtual IP address to the real IP addresses of machines belonging to the sink EPG because the two rules' EMSs overlap and their actions are conflicting. Other errors that the policy graph composer 110 might detect can include, but are not limited to, inadvertent loops or black holes introduced into the underlying logic of the rules or policies that correspond to the network policy graphs and/or policy boxes.

System Output to Policy Graph Sources

As illustrated in FIG. 8, the output to the user can be a composite network policy graph along with its implications. In the example of Operator graph 700 and tenant graph 705 herein, there is a single suggested composite network graph 800 provided. However, in other cases more than one suggestion may be provided accompanied by corresponding implications. The users can then select one of the provided suggestions by considering the implications of the conflicts that may arise. If none of the suggestions reflects the appropriate goal, the user can then take actions such as tightening the EPG set definitions, revising the graphs or concretizing/fixing policy box internal behaviors and resubmitting the graphs for composition. The procedure repeats until the user is satisfied and validates a provided suggestion.

Update and Deployment to the Network

Once the user accepts a suggested composite network policy graph, the policies from the composite graphs can be compiled into switch rules and applied to the physical topology. The rules are compiled for any existing endpoints that are already members of the EPGs. New rules are added when new endpoints join EPGs. Endpoints may also change their membership by leaving one EPG and joining another or obtaining membership in more number of EPGs dynamically. In such scenarios, the rules corresponding to the endpoint can recompiled onto the switches.

According to the foregoing, examples disclosed herein enable network operators to implement or program a network using multiple controller modules that may have disparate policies and objectives regarding the configuration of the topology of the network. Conflicts between the policies and objectives, as represented by the differences in the resource allocation proposals, can be resolved using various election based decision mechanisms, thus allowing the network operator to realize the benefits of the policies and objectives of multiple independent controller modules.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. A method for configuring a network comprising:
   receiving, by a processor, a plurality of network policy graphs defined by a policy graph abstraction (PGA) such that the plurality of network policy graphs are visual models specifying policies for configuring the network;
      wherein each of the network policy graphs comprises two or more endpoint group nodes, the endpoint group nodes corresponding to one or more addressable endpoints in the network, connected by directed edges, the directed edges corresponding to directed paths that define flows of packets among the one or more addressable endpoints and through one or more modular policy boxes in the network;
      wherein the modular policy boxes correspond to network service functionality and arranged in a chain to define a composite network service; and
      wherein the PGA comprises a high-level API;
   converting, by the processor, the plurality of network policy graphs into corresponding statements in a network programming language supported by the PGA such that policies for configuring the network are defined by the statements in the network programming language, wherein the network programming language comprises Pyretic;
   generating, by the processor, composite endpoint groups based on relationships between the endpoint groups;
   generating, by the processor, composite paths based on the relationships between the endpoints and the network policy graphs, wherein the composite paths comprise a combination of paths and policy boxes defined in the network policy graphs;
   generating, by the processor, a composite network policy graph based on the composite endpoint groups and the composite paths; and
   analyzing, by the processor, the composite network policy graph or the network policy graphs to determine conflicts or errors based on the statements in the network programming language.

2. The method of claim 1, further comprising generating a command to a controller coupled to the network to program the network according to the composite network policy graph.

3. The method of claim 1, wherein analyzing the composite network graph to determine conflicts comprises generating an error message when a conflict is determined, the error message comprising a request to correct one or more of the plurality of network graphs.

4. The method of claim 1, further comprising accessing a hierarchy of graph domains, and wherein generating the composite network policy graph is further based on the hierarchy of graphs.

5. The method of claim 1, wherein generating the composite endpoint groups comprises splitting a union of two or more of the endpoint group nodes based on set relations between the two or more of the endpoint group nodes.

6. A non-transitory computer readable storage medium comprising instructions, that when executed by a processor, cause the processor to:
- retrieve a plurality of network policy graphs defined by a policy graph abstraction (PGA) such that the plurality of network policy graphs are visual models specifying policies for configuring the network from a graph library;
  - wherein each of the network policy graphs is associated and comprises two or more endpoint group nodes, the endpoint group nodes corresponding to one or more addressable endpoints in a network, connected by directed edges, the directed edges corresponding to directed paths that define flows of packets among the one or more addressable endpoints and through one or more modular policy boxes in the network;
  - wherein the one or more modular policy boxes correspond to network service functionality and are arranged in chain to define a composite network service;
- convert the plurality of network policy graphs into corresponding statements in a network programming language supported by the PGA such that policies for configuring the network are defined by the statements in the network programming language; wherein the PGA comprises a high-level API and the network programming language comprises Pyretic;
- generate composite endpoint groups based on relationships between the endpoint groups;
- generate composite paths among the composite endpoint groups based on relationships between the endpoint group nodes and the directed edges, wherein the composite paths comprise a combination of paths and policy boxes order of the defined in the network policy graphs; and
- generate a composite network policy graph comprising the composite endpoint groups and the composite paths.

7. The non-transitory computer readable storage medium of claim 6, wherein retrieving the plurality of network graphs comprises receiving one or more commands to configure the network from one or more policy graph sources according to the plurality of network graphs.

8. The non-transitory computer readable storage medium of claim 7, wherein the instructions further cause the processor to:
- access a hierarchy comprising relationships among the policy graph sources; and
- determine associations between each of the plurality of network graphs and at least one of the policy graph sources; and
- wherein the composite network graph is further generated based on the relationships among the policy graph sources and the associations.

9. The non-transitory computer readable storage medium of claim 6, wherein the instructions further cause the processor to:
- perform a conflict check on the composite network policy graph to determine conflicts between the network policy graphs, when the conflict check detects a conflict between two or more of the network policy graphs, generating an error message to prompt a correction of the one or more of network policy graphs; and
- when the conflict check detects no conflicts among the network policy graphs, generating a command to program the network according to the composite network policy graph.

10. The non-transitory computer readable storage medium of claim 6, wherein some of the plurality of network policy graphs comprise policy boxes corresponding to implementations of network services, and wherein the instructions that cause the processor to generate the composite paths further cause the processor to generate composite policy box chains comprising some of the policy boxes based on hierarchical domain relationships among the endpoint groups and the policy boxes.

11. The non-transitory computer readable storage medium of claim 9, wherein the instructions further cause the processor to convert the composite network policy graph into a high-level network programming language, and wherein the command comprises the high-level network programming language.

12. A network policy graph composer system comprising:
- a processor; and
- a non-transitory computer readable medium comprising instructions that when executed by the processor cause the processor to:
  - provide a network policy graph editor to generate a plurality of network policy graphs in response to corresponding input from a plurality of users;
    - wherein each of the network policy graphs are visual models specifying policies for configuring the network comprises two or more endpoint group nodes, the endpoint group nodes corresponding to one or more addressable endpoints in a network, connected by directed edges, the directed edges corresponding to directed paths that define flows of packets among the one or more addressable endpoints and through one or more modular policy boxes in the network;
    - wherein the one or more modular policy boxes correspond to network service functionality and are arranged in a chain to define a composite network service;
  - convert the plurality of network policy graphs into corresponding statements in a network programming language such that policies for configuring the network are defined by the statements in the network programming languages wherein the PGA
  - generate composite endpoint groups based on relationships between the endpoint groups described in the statements;
  - generate composite paths among the composite endpoint groups based on the relationships between the endpoint group nodes and the directed edges described in the statements, wherein the composite paths comprise a combination of paths and policy boxes order of the defined in the network policy graphs; and
  - generate a composite network policy graph comprising the composite endpoint groups and the composite paths.

13. The network policy graph composer system of claim 12, wherein the instructions further cause the processor to generate a command to program the network according to the composite network policy graph.

14. The network policy graph composer system of claim 12, wherein the network policy graph editor comprises a graphical user interface receiving input from the users for defining the plurality of network policy graphs.

15. The network policy graph composer system of claim 12, wherein the instructions further cause the processor to perform a conflict check to detect conflicts between among the plurality of network policy graphs.

16. The network policy graph composer system of claim 12, wherein the network policy graph editor comprises a library of previously defined network policy graphs, and wherein to generate at least some of the plurality of network policy graphs, the network policy graph retrieves the at least some of the previously defined network policy graphs.

\* \* \* \* \*